United States Patent [19]
Waite et al.

[11] Patent Number: 5,764,752
[45] Date of Patent: Jun. 9, 1998

[54] OFF-HOOK TELEPHONE CLEARING SYSTEM

[75] Inventors: Tyler E. Waite, Lakewood, Colo.; Jeffrey M. Byrd, Rome, Ga.

[73] Assignee: South Tech Instruments, Inc., Hollywood, Fla.

[21] Appl. No.: 616,222

[22] Filed: Mar. 15, 1996

[51] Int. Cl.⁶ .................................................. H04M 1/00
[52] U.S. Cl. .......................... 379/377; 379/418; 379/393
[58] Field of Search .............................. 379/373, 375, 379/208, 32, 33, 80, 187, 387, 393, 377, 418

[56] References Cited

U.S. PATENT DOCUMENTS

| | | |
|---|---|---|
| 2,731,514 | 1/1956 | Oberman . |
| 2,771,511 | 11/1956 | Morris, Jr. ............................... 379/187 |
| 2,913,529 | 11/1959 | Jacobaeus et al. . |
| 3,150,237 | 9/1964 | Baldik et al. ........................... 379/387 |
| 3,699,265 | 10/1972 | Altenburger . |
| 3,919,487 | 11/1975 | Gabrielson ............................. 379/187 |
| 4,021,621 | 5/1977 | Wycheck . |
| 4,109,112 | 8/1978 | Denman et al. ...................... 379/399 X |
| 4,903,291 | 2/1990 | Tsurufuji et al. .................... 379/389 X |
| 4,922,529 | 5/1990 | Kiel ............................................ 379/387 |
| 4,998,271 | 3/1991 | Tortola et al. ............................ 379/32 |
| 5,283,825 | 2/1994 | Druckman et al. . |
| 5,390,249 | 2/1995 | Park ..................................... 379/377 X |
| 5,392,334 | 2/1995 | O'Mahony . |
| 5,422,939 | 6/1995 | Kramer et al. . |
| 5,592,529 | 1/1997 | Linsker ................................ 379/377 X |
| 5,612,997 | 3/1997 | Vallelonga, Sr. et al. .......... 379/377 X |

*Primary Examiner*—Ahmad F. Matar
*Attorney, Agent, or Firm*—Herbert L. Lerner; Laurence A. Greenberg

[57] ABSTRACT

An off-hook telephone clearing system for a telephone line having at least two telephones connected thereto, comprising a howler tone detector connected to each telephone, and a telephone disconnect device having an input responsive to the howler tone detector for disconnecting a telephone being in off-hook condition from the telephone line. The clearing system may include a latching relay in the disconnect device. The latching relay may be mechanically coupled to the telephone hookswitch for delatching upon hang-up of the receiver.

14 Claims, 4 Drawing Sheets

FIG. 2-A

OFF-HOOK TELEPHONE CLEARING SYSTEM

The invention relates to an environment wherein at least two telephone instruments or similar devices are connected to a common telephone line. In such an environment one of the telephone instruments may be inadvertently in an off-hook condition, thereby preventing reception of telephone calls to any other one of the telephone instruments.

Background and Prior Art

It is commonly used to connect more than a single telephone to a central telephone office via a single telephone line. In such usage, it is not uncommon that the receiver of one of the telephone instruments is inadvertently left off-hook, thereby rendering the line unusable to the other telephone instruments on the line, and preventing receipt of incoming calls to any of the other telephone instruments, in the following called "telephone(s)". The term "telephone" shall also be understood to include other types of telephone line users, such as FAX-machines, computers arranged to operate on telephone lines, and any other terminal equipment using a telephone line for signaling purposes, such as home invasion alarms, fire alarms and so forth.

The telephone line becomes unusable due to a so-called permanent-lock-out arrangement provided in most telephone exchanges, which protects the exchange against common exchange equipment being tied up by a single telephone line for long periods when no telephone calls are being made on that line.

To that end, telephone exchanges are equipped with permanent lock-out equipment that temporarily disconnects the line from the exchange equipment. The lock-out equipment operates to connect a so-called "howler" tone or signal for a limited time to the line in an attempt to alert users that the line is in a permanent condition. After the howler tone has been applied for a few minutes, the howler tone is disconnected and the line is connected to a low-current source that provides a low rest current that is monitored by special exchange equipment, so that the permanent off-hook condition can be detected and removed when the off-hook telephone is again placed in normal on-hook condition.

Since in the modern home and office environment the use and availability of a telephone line is often very important, it is accordingly an object of the present invention to provide protection against the condition that a telephone line becomes inoperable in lock-out condition due to a single one of several uses on the line inadvertently being in off-hook condition.

A patent search undertaken by the inventor has not uncovered any related prior art to the present invention.

SUMMARY OF THE INVENTION

An off-hook telephone clearing system for a telephone line having at least two telephones connected thereto, comprising a howler tone detector connected to each telephone, and a telephone disconnect device having an input responsive to the howler tone detector for disconnecting a telephone being in off-hook condition from the telephone line.

According to a further feature, the telephone clearing system includes line interfacing means having inputs connected to the line for electrically interfacing the clearing system to the line.

According to another feature, the clearing system includes a holding device for holding said disconnect device in disconnect condition for a given holding time.

According to still another feature, the disconnect device includes at least one break contact, but advantageously two break contacts for maintaining line balance, each in series with a respective conductor of the telephone line, and having an input connected to the howler tone detector for activating said break contacts.

According to an additional feature, the disconnect device includes a relay having a relay coil in operative engagement with the break contacts.

According to another feature, the holding device includes at least one holding capacitor coupled to the disconnect device for holding the disconnect device in disconnect condition for the given holding time.

According to an additional feature, the howler tone detector includes at least one rectifier diode for rectifying the howler tone, the rectifier diode being coupled to the holding capacitor for charging the holding capacitor, and including delay means connected between said disconnect device and said howler tone detector for delaying operation of said disconnect means for a given delay time.

According to a further feature, the interfacing means include at least one interfacing capacitor.

According to another feature, the line interfacing means include a transformer having a primary and secondary winding respectively connected to the telephone line and the howler tone detector.

According to still another feature, the relay includes latching means for latching the relay in operated condition.

According to a further feature, the latching means include a magnetically biased relay core for magnetically holding the relay in operated condition.

According to an additional feature, the latching means include a at least one latching relay contact connected to the relay coil for holding the relay in operated condition.

According to a further feature, the disconnect device the latching relay is mechanically linked to the hook-switch of the telephone so that the relay is un-latched when the telephone receiver is restored to the cradle.

Other features which are considered as characteristic for the invention are set forth in the appended claims.

Although the invention is illustrated and described herein as embodied in the off-hook telephone clearing system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENT

Figure 1:
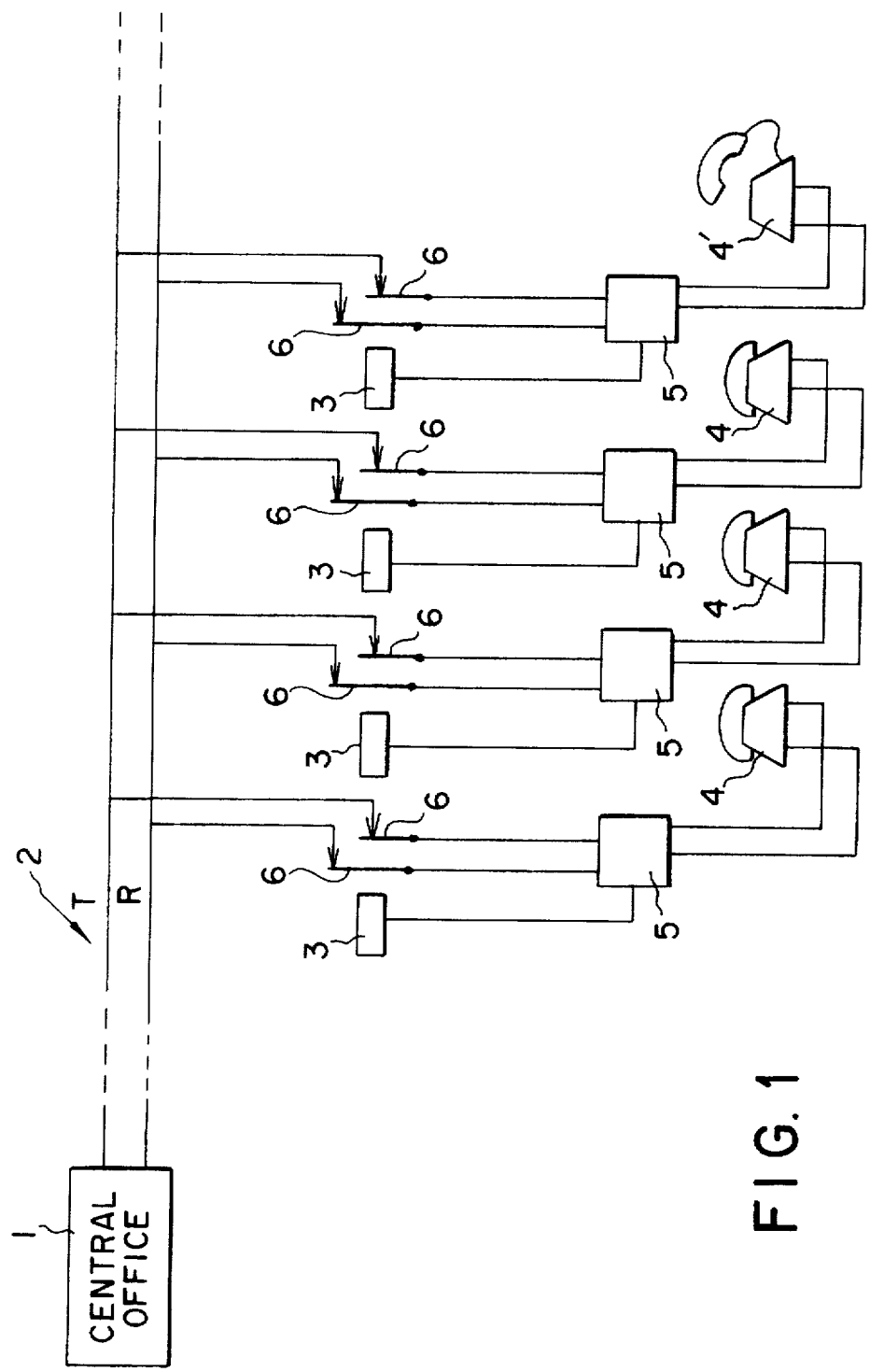
FIG. 1 shows a plurality of telephones connected to a common telephone line via respective disconnect devices.

FIG. 1 is a block diagram of the inventive concept, wherein three telephones 4 in on-hook condition are connected to a telephone line 2 composed of conductors T and R, which lead to a telephone exchange, shown as a central office, that may, however, be instead a PABX or any type of exchange providing permanent off-hook tone, commonly known as "howler tone". A fourth telephone 4' also connected to the telephone line 2 is shown in off-hook condition. Each telephone 4, 4' is connected to the telephone line 2 via a telephone off-hook clearing device composed of telephone disconnect device 3 in the form of a relay having break contracts 6 inserted in the line conductors T, R and an apparatus assembly 5, which operates to activate the break contacts 6 in case a permanent off-hook condition is encountered on the telephone line, as the result of one of the telephones 4, 4' being off-hook for a time sufficient to activate so-called permanent lock-out equipment (not shown) in the central office 1.

In case the lock-out equipment in the telephone exchange is activated a so-called howler tone is applied to the line T, R. The howler tone is of a signal strength considerably above the strength of conventional signals applied to a telephone line with exception of the ringing signal, which is of a voltage typically 75–100 vol r.m.s., but of very low frequency, typically from 20 to 60 Hertz. The ringing signal is never applied to a line in off-hook condition. The howler tone is applied to the line at a high signal strength in order to attempt to attract the attention of any person being near the telephone in order induce that person to restore the handset to on-hook condition. The howler tone is normally applied for only a few minutes, after which time the line is switched to so-called permanent off-hook condition in which a d-c voltage is applied to the line so that an on-hook condition can later be detected by the lock-out equipment which then restores the line to normal operating on-hook condition. Before the howler tone is applied to the line, normally a recorded message urging a person near the telephone to replace the handset. The recorded message does not affect the apparatus according to the present invention. It should also be noted that other devices such as FAX machines and computer modems and other signalling devices are often connected to a telephone line. In many telephone installations one or more of the telephones and/or the other devices are situated in different locations, and therefore one of the telephones or the other devices being in permanent off-hook condition will render the remaining devices inoperative as described above, unless a disconnect device as disclosed herein, is connected to each of the telephones, and the other devices.

Figure 2:
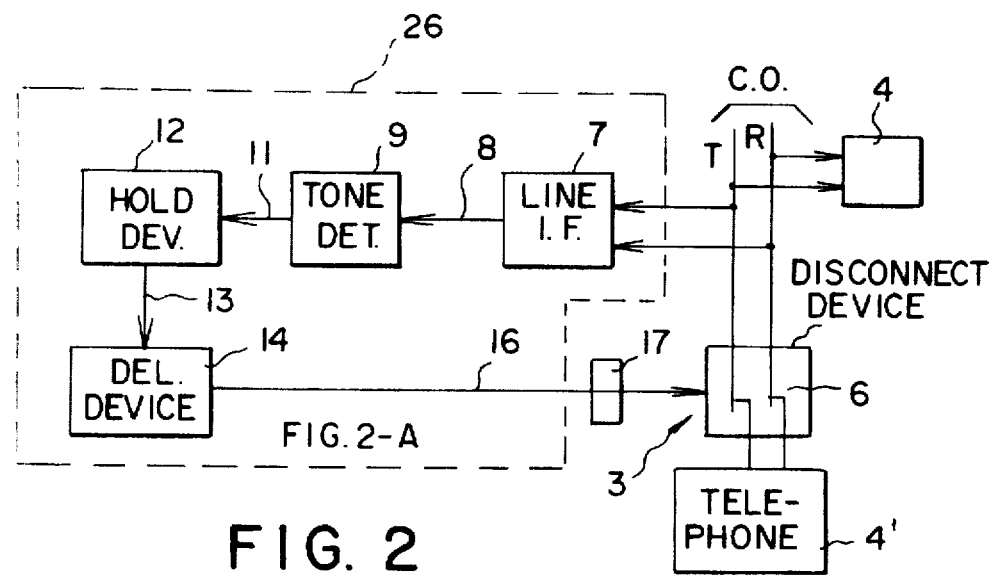
FIG. 2 is a block diagram of the invention showing its major building blocks.

FIG. 2 is a block diagram, showing the basic concept of the invention, wherein the central office line T, R serves telephones or other devices 4, 4'. The telephone 4' is shown with the various components of an off-hook telephone clearing system, namely a line interface 7 which serves to prevent the telephone clearing system from reflecting adversely into the telephone line, such as by changing its nominal impedance, attenuating normal signals, unbalancing the line, or feeding unwanted signals into the line, and so forth.

The line interface 7 is typically configured in the form of a pair of matched capacitors, or a transformer as described in more detail below.

The line interface 7 is connected at its output 8 to a tone detector 9 which operates to detect the howler tone applied to the line by the central office, and to convert the howler tone to an output signal on output 11, typically in the form of a direct current DC signal, which is applied to a holding device 12. The holding device 12 serves to accumulate the DC-current from the tone detector for a short holding time until sufficient DC-energy has been accumulated to activate the disconnect device 3. The holding device 12 typically includes a capacitor for accumulating the DC current from tone detector 9.

The output 13 of the holding device 12 is applied via a delay device 14 to the input 16 of the disconnect device 3.

The output 13 of the holding device 12 is disconnected either directly to the disconnect device 3, or through a delay device 14, which operates to delay the operation of the disconnect device 3 until sufficient operating energy is stored in the holding device 12 to insure positive operation of the disconnect device. Without the delay device 14, the energy accumulating in the holding device 12 may simply bleed off without effecting a positive operation of the disconnect device.

Figure 3:
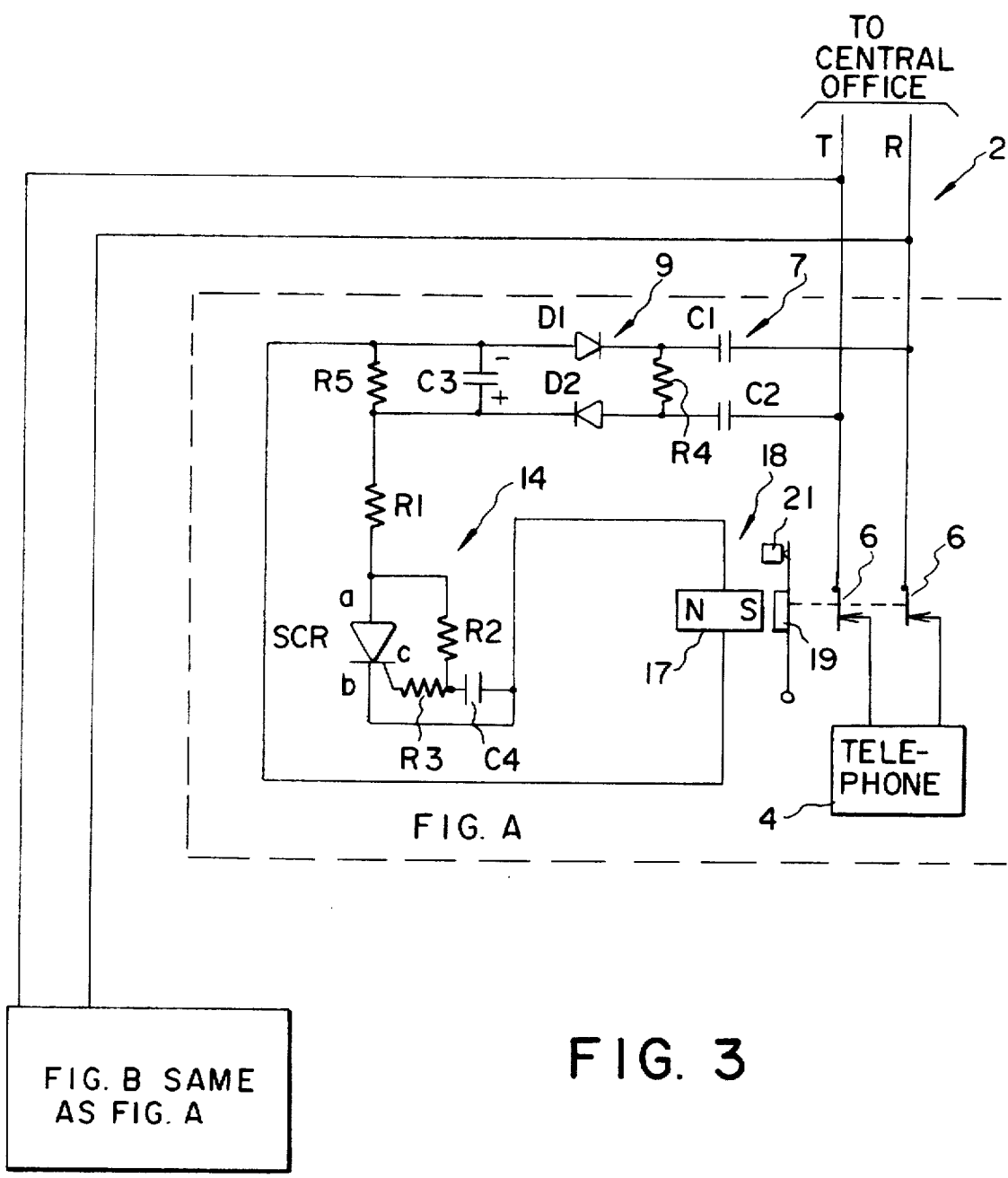
FIG. 3 is a circuit diagram of the invention with two-capacitor coupling to the telephone line.

Referring now to FIG. 3, which shows a more detailed arrangement of a typical embodiment of the invention, the telephone line 2 is connected to first telephone 4 in dashed line box FIG. A, and a second telephone in the box FIG. B, which is similar to FIG. A. In FIG. A, the telephone line 2 is connected via capacitors C1, C2, which constitute the line interface, to two rectifier diodes D1, D2, which constitute the howler tone detector. The respective anode and cathode of diodes D1, D2 are connected to a bridging capacitor C3, which constitutes the holding circuit. The output from diodes D1, D2 are connected via delay circuit 14 to an operating relay coil 17 of a magnetically latching relay 18 having break contacts 3, which are in turn mechanically coupled to a relay armature 19. The relay coil 17 contains a lightly permanently magnetized core showing opposite magnetic poles N and S.

In operation, when telephone 4 is in extended off-hook condition without having set up a connection, the central office will transmit howler tone on line 2. The howler tone signal is coupled via capacitors C1, C2 and bypass resistor R4 to rectifier diodes D1, D4, which build up an electric charge + and − on holding capacitor C3. The electric charge is initially prevented from reaching relay coil 17 by delay circuit 14, composed of an SCR (Silicon Controlled Rectifier), and having an anode a, a cathode b and a control pin c. The SCR is initially non-conducting until charge on capacitor C3 builds up to the point when the common nodes of a resistor-capacitor delay circuit formed of series-connected resistor R2, delay capacitor C4, and resistor R3 has charged up to reach firing threshold voltage for control pin C. At that point the SCR is fired and goes into full conduction, enabling the charge stored on holding capacitor C3 to activate relay coil 17, so as to reinforce the permanent magnetic field N-S until the armature 19 is operated and held by the coil 17 and held magnetically latched after capacitor C3 has discharged. After holding capacitor C3 is completely discharged, the armature 19 remains operated, until the armature 19 is reset manually by means of push button 21 on armature 19, when a person arrives and restores the handset on telephone 4, or restored by other means, such as mechanical linkage to the telephone hookswitch.

Due to the delay circuit 14 it is assured that sufficient charge has built up on holding capacitor C3 to insure positive operation of relay 18. A shunt resistor R5 across holding capacitor C3 of rather large resistance value, e.g. greater than one MOhm insures that noise or conversation on the telephone line T, R does not slowly build up enough potential to activate the disconnect relay 17. The capacitors C1, C2, with shunt resistor R4 are arranged to have a time constant small enough to insure that low frequency signals, such as ringing, do not activate the SCR and relay 17.

Figure 4:
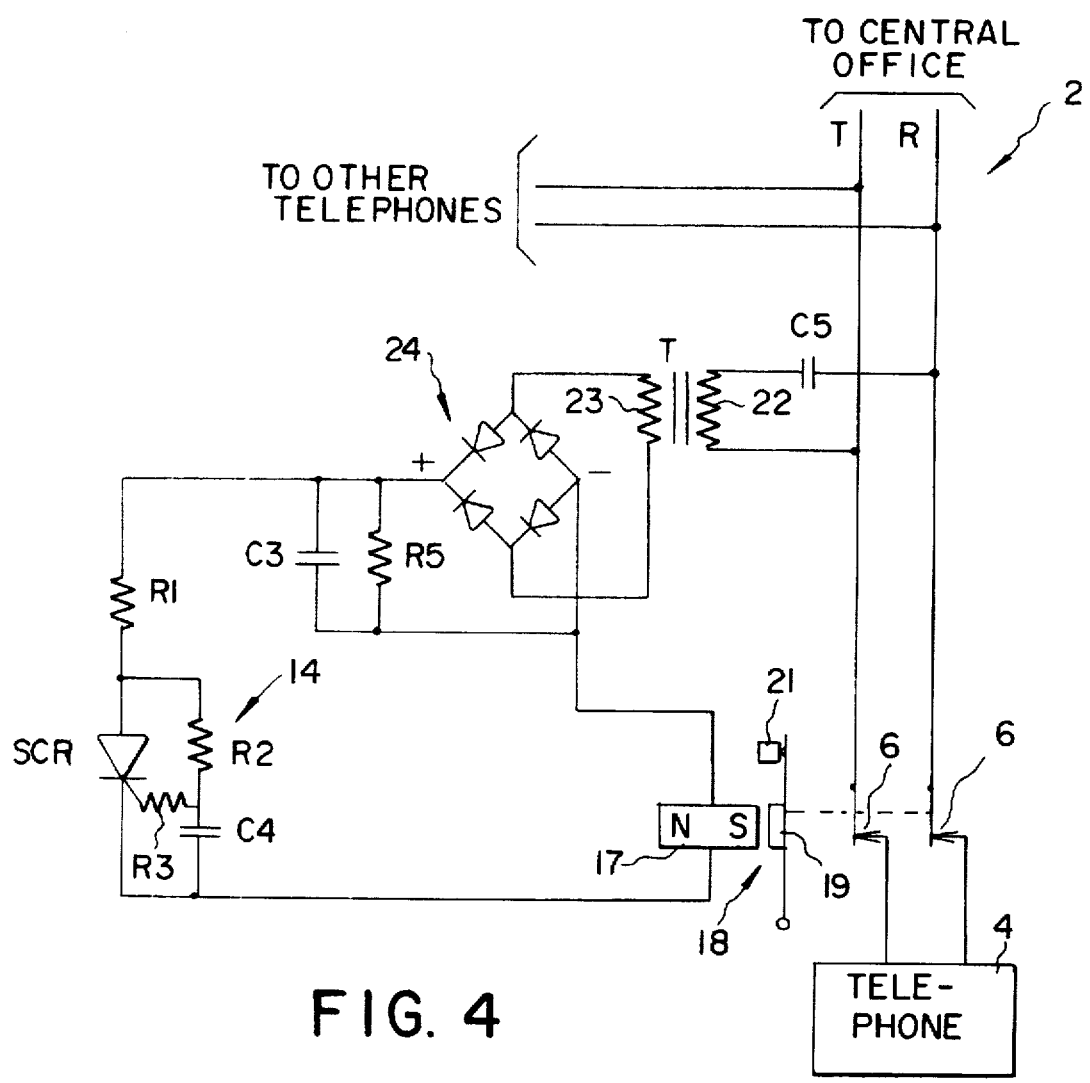
FIG. 4 is a circuit diagram of the invention with transformer coupling to the telephone line.

FIG. 4 is a disconnect circuit that has certain components similar to those of FIG. 3, such as the delay circuit 14, the disconnect relay 18, and the holding capacitor C3 with shunt resistor R5. However, the coupling capacitors C1 and C2 have been replaced by a transformer T having a primary winding 22 connected via a dc-blocking capacitor C5 to telephone line 2. The blocking capacitor C5 is advantageously chosen with a capacitance value that resonates with the primary winding 22 at a frequency close to that of the howler tone, thereby insuring maximum transfer of power from the howler tone and minimal loading of the line at other frequencies. The secondary winding 23 is connected to a 4-way rectifier bridge 24, the dc-output of which is connected to holding capacitor C3, and shunt resistor R5, having the same functions as in FIG. 3. Also, the delay circuit 14 and the magnetically latching disconnect circuit 18 are the same as in FIG. 3.

It follows that an alternative electrically latching arrangement could be arranged by means of a disconnect relay having a hold winding connected by means of a make relay contact to a current source, such as a battery or low-voltage dc-power.

According to a feature, the off-hook clearing device may be combined with the telephone instrument, connected to the telephone line in a common housing.

Figure 5:
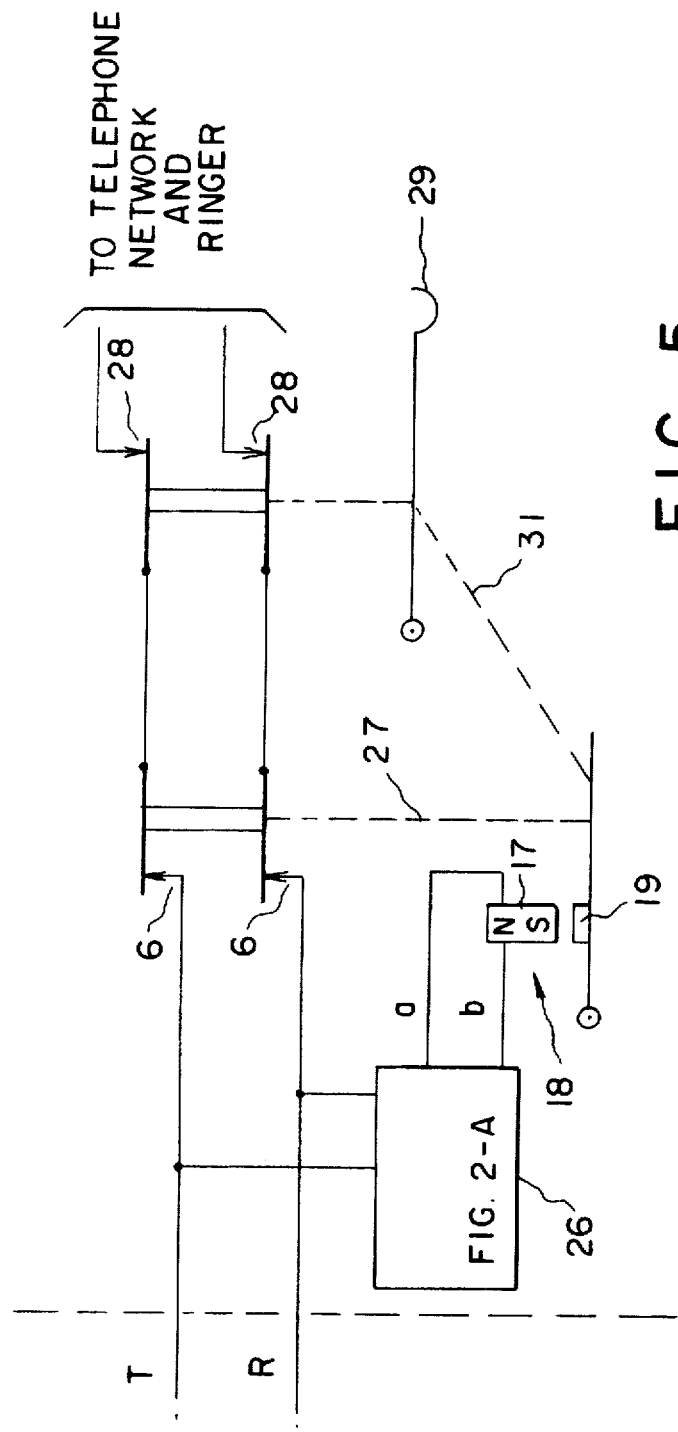
FIG. 5 shows an arrangement wherein the hookswitch of the telephone is coupled to the latching relay for unlatching it upon restoring of the telephone to the on-hook condition.

FIG. 5 shows the embodiment of the invention, wherein the off-hook clearing device and the telephone instrument are coupled together so that the disconnect switch is mechanically coupled to the hookswitch of the telephone, thereby causing automatic reset of the latching arrangement as soon as the receiver is restored to the cradle.

In FIG. 5 tip and ring conductors T,R enter from the left hand side and are connected to the operating circuit 26 for the disconnect device shown in FIG. 2-A. The operating circuit 26 has output leads a, b connected to the relay coil 17, which upon activation caused by a permanent off-hook condition operates armature 19, which in turn attracts and latches armature 19 in latched position, opening disconnect contacts 6 as described above by means of relay linkage 27, shown as a phantom line. It follows that in this state, the telephone hookswitch contacts 28 will be in closed condition, since the receiver (not shown) will be off the cradle 29. When the telephone receiver is restored to its position in the cradle 29, the hookswitch contacts are again opened. A mechanical linkage 31, shown as a phantom line mechanically couples the cradle 29 with the armature 19 and resets disconnect relay 18 to its normal un-latched position, as shown in FIG. 5, with the disconnect contacts 6 again closed.

We claim:

1. An off-hook telephone clearing system for a telephone line having at least two telephones connected thereto comprising a howler tone detector connected to each telephone, a telephone disconnect device having an input responsive to the howler tone detector for disconnecting a telephone being in permanent off-hook condition from the telephone line;

wherein said disconnect device includes at least one break contact in series with a respective conductor of said telephone line; and wherein the disconnect device further includes an input connected to said howler tone detector for activating said break contacts, said howler tone detector including a storage device for storing energy derived from the howler tone for energizing activation of said break contact.

2. An off-hook telephone clearing system according to claim 1, wherein said telephone clearing system includes line interfacing means having inputs connected to the line for electrically interfacing the clearing system to the line.

3. An off-hook telephone clearing system according to claim 2, wherein said clearing system includes a holding device for holding said disconnect device in disconnect condition for a given holding time after receipt of howler tone.

4. An off-hook telephone clearing device according to claim 1, wherein said disconnect device includes a relay having a relay coil in operative engagement with said break contacts.

5. An off-hook telephone clearing device according to claim 3, wherein said holding device includes at least one holding capacitor coupled to said disconnect device for holding said disconnect device in disconnect condition for said given holding time.

6. An off-hook telephone clearing device according to claim 5, wherein said howler tone detector includes at least one rectifier diode for rectifying said howler tone, said rectifier diode being coupled to said holding capacitor for charging said holding capacitor.

7. An off-hook telephone clearing device according to claim 1 including delay means connected between said disconnect device and said howler tone detector for delaying operation of said disconnect means for a given delay time.

8. An off-hook telephone clearing device according to claim 2, wherein said line interfacing means include at least one interfacing capacitor.

9. An off-hook telephone clearing device according to claim 2, wherein said line interfacing means include a transformer having a primary and secondary winding respectively connected to said telephone line and said howler tone detector.

10. An off-hook telephone clearing device according to claim 4 wherein said relay includes latching means for latching said relay in operated condition.

11. An off-hook telephone clearing device according to claim 10, wherein said latching means include a magnetically biased relay core for magnetically holding said relay in operated condition.

12. An off-hook telephone clearing device according to claim 10, wherein said latching means include at least one latching relay contact connected to said relay coil for holding said relay in operated condition.

13. An off-hook telephone clearing device according to claim 10, wherein said clearing device is combined with said telephone in a common housing.

14. An off-hook telephone clearing device according to claim 10, wherein said telephone has a hookswitch, including linkage means connecting said hookswitch with said latching means, wherein said linkage means are operative for resetting said latching means upon returning said telephone to on-hook state.

* * * * *